United States Patent
Biagini et al.

(10) Patent No.: US 10,150,373 B2
(45) Date of Patent: Dec. 11, 2018

(54) COMPACT CHARGING DEVICE FOR ELECTRIC VEHICLE

(71) Applicant: INTELLIGENT ELECTRONIC SYSTEMS, Saint-Aunes (FR)

(72) Inventors: Eric Biagini, Perols (FR); François Coste, Montpellier (FR); Guillaume Jean, Grau d'Agde (FR)

(73) Assignee: INTELLIGENT ELECTRONIC SYSTEMS, Saint-Aunes (FR)

( * ) Notice: Subject to any disclaimer, the term of this patent is extended or adjusted under 35 U.S.C. 154(b) by 0 days.

(21) Appl. No.: 15/035,209

(22) PCT Filed: Nov. 6, 2014

(86) PCT No.: PCT/EP2014/073930
§ 371 (c)(1),
(2) Date: May 6, 2016

(87) PCT Pub. No.: WO2015/067695
PCT Pub. Date: May 14, 2015

(65) Prior Publication Data
US 2016/0272075 A1  Sep. 22, 2016

(30) Foreign Application Priority Data
Nov. 8, 2013  (FR) ...................... 13 60941

(51) Int. Cl.
*H02J 7/00* (2006.01)
*B60L 11/18* (2006.01)

(52) U.S. Cl.
CPC ....... *B60L 11/1812* (2013.01); *B60L 11/1816* (2013.01); *B60L 11/1818* (2013.01);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS 4,617,506 A  10/1986  Bogie et al.
5,283,513 A   2/1994  Fujita et al.
(Continued)

FOREIGN PATENT DOCUMENTS

CN  101783524 A   7/2010
CN  101882807 A  11/2010
(Continued)

OTHER PUBLICATIONS

PCT/EP2014/073930—International Search Report and Written Opinion dated May 13, 2014, 13 pages.
(Continued)

*Primary Examiner* — Arun C Williams
(74) *Attorney, Agent, or Firm* — Haynes Beffel & Wolfeld LLP; Andrew Dunlap

(57) ABSTRACT

The invention relates to a charging device (1) for an electric vehicle battery (28), this charging device (1) comprising a casing (5) containing electric current conversion means, the casing (5) being provided with a connector (3) making it possible to connect the charging device (1) directly to the electric vehicle so as to power the battery of the electric vehicle, and the charging device (1) being able to be powered by an input current from a power source (21), to convert, via the electric current conversion means, the input current into a direct output current, and to power the battery of the electric vehicle (28) with said direct output current. The invention also relates to a charging method which can be implemented with this charging device.

19 Claims, 1 Drawing Sheet

(52) U.S. Cl.
CPC ....... *B60L 11/1824* (2013.01); *B60L 11/1838* (2013.01); *H02J 7/0054* (2013.01); *H02J 7/0055* (2013.01); *Y02T 10/7005* (2013.01); *Y02T 10/7072* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 8,013,567 | B2* | 9/2011 | Windsor | H01M 2/1072 320/101 |
| 8,120,310 | B2* | 2/2012 | Littrell | H02J 7/35 320/101 |
| 2008/0297103 | A1 | 12/2008 | Windsor | |
| 2009/0161394 | A1 | 6/2009 | Hung et al. | |
| 2011/0055037 | A1 | 3/2011 | Hayashigawa et al. | |
| 2011/0169447 | A1 | 7/2011 | Brown et al. | |
| 2012/0025759 | A1 | 2/2012 | Kressner | |
| 2012/0081073 | A1 | 4/2012 | Niemann et al. | |
| 2013/0049690 | A1 | 2/2013 | Lin | |
| 2016/0288664 | A1 | 10/2016 | Biagini et al. | |

FOREIGN PATENT DOCUMENTS

| | | |
|---|---|---|
| CN | 103187759 A | 7/2013 |
| DE | 102012205972 A1 | 10/2013 |
| EP | 2660950 A2 | 11/2013 |
| EP | 2690749 A1 | 1/2014 |
| FR | 2978303 A1 | 1/2013 |
| JP | 2007267561 A | 10/2007 |
| JP | 2010252520 A | 11/2010 |

OTHER PUBLICATIONS

U.S. Appl. No. 15/035,208—Office Action dated Oct. 20, 2017, 23 pages.
U.S. Appl. No. 15/035,208—Response to Office Action dated Oct. 20, 2017, filed Jan. 18, 2018, 16 pages.
CN 201480060401.7—Office Action dated Mar. 12, 2018, 17 pages.
CN 201480061103.7—Office Action dated Feb. 5, 2018, 10 pages.
PCT/EP2014/073929—International Search Report and Written Opinion dated May 1, 2015, 10 pages.

* cited by examiner

COMPACT CHARGING DEVICE FOR ELECTRIC VEHICLE

FIELD OF THE INVENTION

The present invention relates to a mobile and autonomous compact device for charging an electric vehicle, as well as a charging device making it possible to use the latter.

TECHNICAL FIELD

Many vehicles use electricity and are equipped with batteries, for example electric motor vehicles, as well as lifts, pallet trucks, etc.

The batteries of these vehicles are powered using direct current. To that end, it is known to use charging devices making it possible to convert the alternating current from the electricity distribution grid into appropriate direct current for charging the battery.

Two types of charging devices are known: on the one hand, onboard chargers, which are mounted directly on the electric vehicles; and on the other hand, external chargers, integrated into fixed charging terminals (for example in a workshop, parking lot, garage, or on the road). Furthermore, there are external chargers mounted on moving carriages, which are generally bulky and have a heavy weight.

However, electric vehicles have risks of breakdown, for example due to the limited autonomy of batteries or in case of a failure of the onboard or external charger. Furthermore, electric vehicles may not be equipped with an onboard charger, in particular in the case of a use where battery charging may systematically be done with a fixed external charger in a recharging station, for example.

There is therefore a need to improve the usage safety of electric vehicles.

SUMMARY OF THE INVENTION

The invention first relates to a charging device for an electric vehicle battery, this charging device comprising a casing containing electric current conversion means, the casing being provided with a connector making it possible to connect the charging device directly to the electric vehicle so as to power the battery of the electric vehicle, and the charging device being able to be powered by an input current from a power source, to convert, via the electric current conversion means, the input current into a direct output current, and to power the battery of the electric vehicle with said direct output current.

According to one embodiment, the charging device is a portable device, the casing preferably being provided with a handle.

According to one embodiment, the charging device is capable of being connected to the power source by a power cable.

According to one embodiment, the charging device includes an operating mode in which the power source is an alternating power source, and preferably is the electricity supply grid, and wherein the input current is an alternating current.

According to one embodiment, the charging device includes an operating mode in which the power source is a direct power source, preferably an external battery, and wherein the input current is a direct current.

According to one embodiment, the charging device comprises a first stage converting the input current into a direct intermediate current as well as a second stage converting the intermediate current into an output current.

According to one embodiment, the casing is provided with an additional connector making it possible to connect the charging device directly to the vehicle, preferably so as to exchange information and instructions with the battery of the electric vehicle.

According to one embodiment, the charging device includes a control system adapted for adjusting the parameters of the conversion of the input current into output current; and adapted for exchanging information and instructions with the battery of the first electric vehicle and/or with the power source.

According to one embodiment, the control system is provided with auxiliary power supply means, preferably chosen from among an auxiliary battery and an auxiliary converter adapted for receiving a direct or alternating external current and converting it into a direct supply current of the control system.

According to one embodiment, the electric vehicle is an electric automobile.

The invention also relates to a method for charging an electric vehicle battery, comprising:
  connecting a charging device as described above to a power source;
  connecting said charging device to the electric vehicle by connecting the connector of the charging device directly on a corresponding connector of the electric vehicle;
  supplying the charging device by an input current from the power source;
  converting the input current into a direct output current via the charging device;
  supplying the battery of the electric vehicle via the output current.

According to one embodiment, the output current has a voltage of 200 to 550 V; and/or the output current has a power less than or equal to 20 kW, preferably less than or equal to 10 kW or 6 kW.

According to one embodiment, the conversion of the input current into output current comprises a first step for converting the input current into a direct intermediate current, then a second step for converting the intermediate current into an output current.

According to one embodiment, the input current is an alternating current.

According to one embodiment, the input current is a direct current.

According to one embodiment, the method comprises connecting the charging device to the electric vehicle by connecting the connector of the charging device directly on a connector of the vehicle.

According to one embodiment, the method comprises adjusting parameters for the conversion of the input current into output current and exchanging information and instructions between the charging device and the battery of the electric vehicle and/or the power source; the method preferably comprising sending an instruction from the charging device to the power source to trigger the supply of power to the charging device from the power source.

According to one embodiment, the method comprises a preliminary step for supplying power to the charging device via an auxiliary power supply source, preferably chosen from among an auxiliary battery and a direct or alternating external current.

According to one embodiment, the electric vehicle is an electric automobile.

The present invention makes it possible to overcome the drawbacks of the state of the art. It more particularly makes it possible to improve the usage safety of electric vehicles.

This is accomplished owing to the development of a compact charging device, which can form a real backup charger making it possible to recharge an electric vehicle battery.

Traditional external chargers are connected to vehicles using a power cable, provided at its end with a connector (or plug) dedicated to the vehicle. The invention proposes to integrate a charging device into a casing provided with connectors for a direct connection to the vehicle. Thus, the manipulations necessary to recharge the battery of the vehicle are made easier, and the charging device can easily be stored and transported, in particular to be used as a backup charging device, for example in case of absence or failure (or unavailability) of an onboard charger or a stationary external charger.

The proposed charger is thus integrated into the charging plug.

DESCRIPTION OF EMBODIMENTS OF THE INVENTION

The invention will now be described in more detail and in a non-limiting manner in the following description.

The invention offers a mobile, removable, compact and transportable charging device, adapted for powering an electric vehicle battery. An electric vehicle refers to a motorized device capable of moving or transporting people or equipment, the motor of which is supplied with electricity by a motor battery (preferably fully, but optionally only partially in the case of a hybrid electric vehicle).

The electric vehicle is preferably an electric automobile. Alternatively, it may for example be a handling vehicle such as a power lift truck, an aerial lift, or a pallet truck.

"Portable" or "transportable" means that the device can be lifted and moved by one healthy adult, without the assistance of any specialized equipment. The device is not permanently integrated on a fixed structure such as an electric vehicle charging terminal. The device is also not permanently integrated in the electric vehicle, i.e., it is not an onboard charger.

As an illustration, the device may have a mass less than or equal to 20 kg, preferably less than or equal to 15 kg, or 10 kg, or 7.5 kg, or 5 kg.

As an illustration, the device (i.e., its casing described below) may have a maximum dimension smaller than or equal to 60 cm, preferably smaller than or equal to 50 cm, or 40 cm, or 30 cm.

Figure 1:
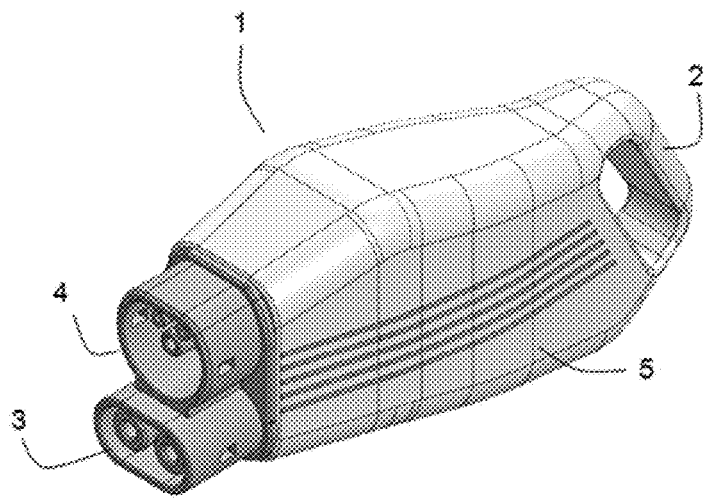
FIG. 1 is a three-dimensional view of a charging device according to one embodiment of the invention.

FIG. 1 provides an example charging device 1 according to the invention. The latter comprises a casing 5 containing electric current conversion means, and optionally a handle 2 making it easier to grip.

A connector 3 and an additional connector 4 (which is optional) are provided on one face of the casing 5 (preferably opposite the handle 2); both are adapted for being connected directly to associated connectors (or plugs) of the electric vehicle. "Directly" means without intermediary, and in particular without intermediate power cable.

The connector 3 is adapted for supplying the battery of the vehicle. According to one embodiment, the connector 3 allows a direct connection to the DC contacts of the battery of the vehicle, which are in principle used by external quick charging or semi-quick charging systems.

The additional connector 4 is adapted for example for connecting the charging device 1 to the ground and/or for exchanging information or control signals with the electric vehicle.

The charging device 1 further comprises means for connecting to a power source (not shown here), for example arranged in the handle 2 or next to it.

These connecting means can for example be another connector arranged on the casing 5, and adapted for being connected to a power cable making it possible to connect the charging device 1 to the power source. Alternatively, these connecting means can in turn comprise a power cable leaving the casing 5 and provided at its free end with a connector, making it possible to connect the charging device 1 to the power source.

Advantageously, the means for connecting to the power source make it possible to supply the charging device 1, but also preferably allow a connection to the ground and/or exchange of information or control signals with the power source.

The charging device 1 according to the invention connects to the vehicle in place of a cable coming from a fixed recharging terminal, but it performs the charging with a power that is preferably limited, compatible with its backup or booster charging function.

According to a first operating mode, the power source is an alternating power source, for example the general electricity distribution grid. It supplies the charging device 1 with alternating input current, preferably a monophasic current (alternatively, optionally, a multiphase current, in particular tri-phase). If the input current is a monophasic current, it may for example have a voltage from 85 to 265 V (for example, 110 or 230 V).

According to a second operating mode, the power source can be a direct power source, for example a fixed external battery, or an external battery on a moving carriage, or an external battery onboard an emergency vehicle.

In this second embodiment, the delivered input current can for example have a voltage from 20 to 1500 V, preferably from 50 to 550 V, more particularly preferably from 200 to 550 V, and especially particularly from 300 to 500 V.

According to one embodiment, the external battery can be a battery of another electric vehicle. This operating mode then corresponds to a vehicle-to-vehicle emergency charging situation, useful for a vehicle that is no longer able to reach a charging station.

According to one embodiment, the charging device is adapted for operating according to the first operating mode only.

According to one embodiment, the charging device is adapted for operating according to the second operating mode only.

According to one embodiment, the charging device is adapted for operating according to both the first operating mode and the second operating mode.

In each operating mode, the output current delivered is a direct current appropriate for charging electric vehicle battery, i.e., having a voltage from 20 to 1500 V, preferably from 50 to 550 V, still more particularly preferably from 200 to 550 V, and especially particularly from 300 to 500 V.

In the first operating mode, the charging device 1 performs an AC-DC conversion. In the second operating mode, it performs a DC-DC conversion.

Generally, the voltage of the output current is different from the voltage of the input current, even when the power source is a direct power source. This is in particular due to the fact that the voltage at which an electric vehicle battery charges (or depletes) varies depending on its charge level.

Thus, the charging device 1 can, depending on the case, act as a step-up or step-down transformer.

According to one embodiment, the charging device 1 comprises galvanic insulation between the input and the output.

According to one alternative embodiment, the charging device 1 has no galvanic insulation between the input and the output.

According to one embodiment, the charging device 1 performs a conversion of the input current into an intermediate (direct) current, then the conversion of the intermediate current into an output current. Preferably, the conversion of the intermediate current into an output current is done using a transformer provided on either side with cutting conversion modules.

Preferably, the charging device 1 comprises means for exchanging information and instructions with the power source (or with the different possible power sources) and with the electric vehicle (for example, with the battery thereof); as well as means for adjusting parameters of the conversion of the input current and output current, in particular based on information received from the power source and/or information received from the battery of the electric vehicle to be charged and/or instructions given by the user. All of these means make it possible to provide complete management of the charging protocol.

The interface of the charging device 110 must be compatible with standard EN61851, in modes 1 and/or 2 and/or 3, and/or compatible with the Chademo standard and/or with standard ISO 15118 and/or compatible with standard J1772 and/or any other standard defining a protocol and a system for communication between the charging device, the power source and the vehicle.

According to one embodiment, the charging device 1 operates according to one or another standard depending on the vehicle to be charged and the power source.

The means for exchanging information and instructions with the power source can in particular be able to trigger the supply of input current by the power source, as part of a secure operation.

The means for exchanging information and instructions with the power source can also be capable of avoiding excessive depletion thereof, when it involves a vehicle battery (first operating mode), or even an external battery (second operating mode).

According to one embodiment, the electric vehicle whose battery is charged using the charging device according to the invention is an electric vehicle with no onboard charger (i.e., device performing a conversion of alternating electric current into direct current capable of powering the battery).

According to one embodiment, the charging device 1 includes auxiliary power supply means. These power supply means can in particular be used to allow the exchanging of information and instructions with the power source and with the battery to be charged in a preliminary phase, making it possible to trigger the supply of current by the power source.

These auxiliary power supply means can comprise an auxiliary battery (or one or several electric battery cells) in the charging device 1 itself. Alternatively, it is possible to provide an auxiliary converter capable of being supplied with external current and converting it into direct current adapted for the operation of the charging device 1 in particular during the aforementioned preliminary phase.

It is in particular possible to provide for supplying this auxiliary converter with an alternating current from the electricity distribution grid. It is also possible to provide for powering it with an external battery, or with the onboard electric grid that powers the equipment of the electric vehicle.

These auxiliary power supply means are particularly useful when neither the source nor the vehicle intended to be charged has an available power supply source at its charging connector. Indeed, for security reasons, direct access to dangerous voltages at the charging connectors is not authorized without the proven presence of an appropriate connection, and without this connection being identified via secure control means by the vehicle and its supervision system as being an appropriate connection to a source.

This identification is done by exchanging signals between the vehicle and the source. It is therefore necessary to have a prior power source, to be capable of establishing the exchange of signals in order to trigger the connection of the electrical contacts making it possible to power the charging of the vehicle.

Figure 2:
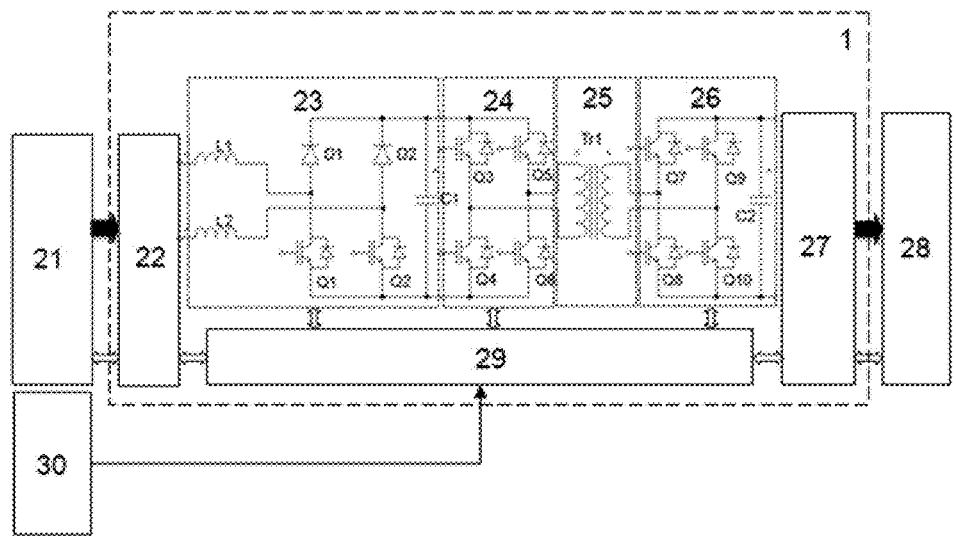
FIG. 2 is an example of a general electrical diagram of the electric current conversion means of the charging device according to the invention.

In reference to FIG. 2, one possible electrical circuit for the electric current conversion means of the charging device 1 according to the invention is described in more detail.

In this example, the charging device 1 comprises an input interface 22 that exchanges information and instructions with a power source 21 and can be supplied with electric current by this power source 21.

The charging device 1 also comprises an output interface 27 that exchanges information and instructions with an electric vehicle battery 28 and can supply the latter with electric current.

The charging device 1 further includes a first module 23, a second module 24 and a third module 26. A transformer 25 is provided between the second module 24 and the third module 26.

The first module 23 constitutes the first stage of the converter (performing the input current/intermediate current conversion) and the assembly formed by the second module 24, the transformer 25 and the third module 26 constitutes the second stage of the converter (performing the intermediate current/output current conversion).

The first module 23 is connected to the input interface 22. It comprises a set of inductances L1, L2, diodes D1, D2, switching elements Q1, Q2 and a capacitor C1. This first module 23 is capable of converting an alternating input current (from the power source 21) into a direct current with voltage U1 across the terminals of the capacitor C1 (intermediate current). This first module 23 also performs a power factor correction function. It is also capable of operating in DC-DC conversion when the power source 21 provides a direct input current.

The second module 24 is a bridge clipper, comprising switching elements Q3, Q4, Q5, Q6. It converts the direct current with voltage U1 into an alternating current supplying the transformer 25. It preferably has a resonant or quasi-resonant structure.

The transformer 25 provide the galvanic insulation, which is required by safety standards for any charging from the electricity distribution grid.

It forms an alternating current at the input of the third module 26, which is a rectifier, comprising switching elements Q7, Q8, Q9, Q10 and a capacitor C2. This rectifier supplies a direct current voltage U2 across the terminals of the capacitor C2 and thus to the output interface 27 (output current).

A control system 29 receives information and provides instructions to the input interface 22, the output interface 27 and the first module 23, second module 24 and third module 26.

This control system 29 is supplied with energy by auxiliary power supply means 30 as described above. The auxiliary power supply means 30 can be comprised in the charging device 1 or be outside the latter, as shown in the figure.

If the charging device 1 is only used according to the second operating mode, it is possible to use a simplified structure only performing a DC-DC conversion, and for example with no transformer 25, if galvanic insulation is not required for safety reasons.

Another possible (simplified) structure that may be used in place of the structure described above would include a single conversion module provided with a complex command.

The invention claimed is:

1. A charging device (1) for an electric vehicle battery (28), the charging device (1) comprising a casing (5) containing an electric current converter, the casing having an outer surface, a connector (3) provided at the outer surface making it possible to connect the charging device (1) directly, without an intermediate power cable, to the electric vehicle so as to power the battery of the electric vehicle, and the charging device (1) being able to be powered by an input current from a power source (21), to convert, via the electric current converter, the input current into a direct output current, and to power the battery of the electric vehicle (28) with said direct output current.

2. The charging device (1) according to claim 1, which is a portable device.

3. The charging device (1) according to claim 1, which is capable of being connected to the power source (21) by a power cable.

4. The charging device (1) according to claim 1, including an operating mode in which the power source (21) is an alternating power source and wherein the input current is an alternating current.

5. The charging device (1) according to claim 1, including an operating mode in which the power source (21) is a direct power source, and wherein the input current is a direct current.

6. The charging device (1) according to claim 1, wherein the charging device (1) comprises a first stage (23) converting the input current into a direct intermediate current as well as a second stage (24, 25, 26) converting the intermediate current into an output current.

7. The charging device (1) according to claim 1, wherein the casing (5) is provided with an additional connector (4) making it possible to connect the charging device (1) directly to the vehicle.

8. The charging device (1) according to claim 1, including a control system (29) adapted for adjusting the parameters of the conversion of the input current into output current; and adapted for exchanging information and instructions with the battery of the first electric vehicle (28) and/or with the power source (21).

9. The charging device (1) according to claim 8, wherein the control system (29) is provided with auxiliary power supply means (30).

10. The charging device (1) according to claim 1, wherein the electric vehicle is an electric automobile.

11. A method for charging an electric vehicle battery (28), comprising:
connecting a charging device (1) according to claim 1 to a power source (21);
connecting said charging device (1) to the electric vehicle by connecting the connector (3) of the charging device (1) directly on a corresponding connector of the electric vehicle;
supplying the charging device (1) with an input current from the power source (21);
converting the input current into a direct output current with the charging device (1);
supplying the battery of the electric vehicle (28) with the output current.

12. The method according to claim 11, wherein the output current has at least one of:
a voltage of 200 to 550 V, and
a power less than or equal to 20 kW.

13. The method according to claim 11, wherein the conversion of the input current into output current comprises a first step for converting the input current into a direct intermediate current, then a second step for converting the intermediate current into an output current.

14. The method according to claim 11, wherein the input current is an alternating current.

15. The method according to claim 11, wherein the input current is a direct current.

16. The method according to claim 11, also comprising connecting said charging device (1) to the electric vehicle by connecting the additional connector (4) of the charging device (1) directly on a connector of the electric vehicle.

17. The method according to claim 11, comprising adjusting parameters for the conversion of the input current into output current and exchanging information and instructions between the charging device (1) and the battery of the electric vehicle (28) and/or the power source (21).

18. The method according to claim 11, comprising a preliminary step for supplying power to the charging device (1) via an auxiliary power supply source (30).

19. The method according to claim 11, wherein the electric vehicle is an electric automobile.

* * * * *